United States Patent [19]

Schmaling

[11] Patent Number: 5,738,494
[45] Date of Patent: Apr. 14, 1998

[54] OPTIMIZED COMPOSITE FLEXBEAM FOR HELICOPTER ROTORS

[75] Inventor: David N. Schmaling, Oxford, Conn.

[73] Assignee: Sikorsky Aircraft Corporation, Stratford, Conn.

[21] Appl. No.: 683,489

[22] Filed: Jul. 18, 1996

[51] Int. Cl.$^6$ .................................................. B64C 27/38
[52] U.S. Cl. .................................................. 416/134 A
[58] Field of Search ........................... 416/134 R, 134 A

[56] References Cited

U.S. PATENT DOCUMENTS

| | | | |
|---|---|---|---|
| 4,008,980 | 2/1977 | Noehren et al. | 416/134 A |
| 4,746,272 | 5/1988 | Noehren et al. | 416/134 A |
| 4,898,515 | 2/1990 | Beno et al. | 416/134 A |
| 5,092,738 | 3/1992 | Byrnes et al. | 416/134 A |
| 5,096,380 | 3/1992 | Byrnes et al. | 416/134 A |
| 5,372,479 | 12/1994 | Byrnes et al. | 416/134 A |
| 5,431,538 | 7/1995 | Schmaling et al. | 416/134 A |
| 5,499,903 | 3/1996 | Schmaling et al. | 416/134 A |

*Primary Examiner*—John T. Kwon
*Attorney, Agent, or Firm*—Brian A. Collins

[57] ABSTRACT

An optimized composite flexbeam (10) having a plurality of adjoining regions including a hub attachment region (HAR), a blade attachment region (BAR), a pitch region (PR), an outboard transition region (OTR) disposed between and adjoining the pitch region and blade attachment regions (PR, BAR), and an inboard transition region (ITR) disposed between and adjoining the pitch and hub attachment regions (PR, HAR). The inboard transition region (ITR) includes a first transition subregion (ITR-1) and a second transition subregion (ITR-2) wherein the second transition subregion (ITR-2) defines a width conic and a critical width transition subregion ($CR_{wt}$). Furthermore, the first and second inboard transition regions (ITR-1, ITR-2) are composed of a combination of unidirectional and off-axis composite materials (U, O) wherein the off-axis composite material (O) defines a percentage %O of off-axis composite material (O) and wherein the percentage %O in the critical transition subregion ($CR_{wt}$) is defined by an optimized curve (70).

5 Claims, 7 Drawing Sheets

OPTIMIZED COMPOSITE FLEXBEAM FOR HELICOPTER ROTORS

TECHNICAL FIELD

This invention is directed to bearingless rotors for helicopters, and, more particularly, to an optimized composite flexbeam therefor having improved structural properties.

BACKGROUND OF THE INVENTION

Helicopter rotor designs are increasingly utilizing a flexible structural member, commonly termed a "flexbeam" or "flexbeam connector", for retention of a helicopter rotor blade to a torque drive hub member. Basic operational constraints of rotary wing flight impose substantial functional complexity upon the rotor flexbeam necessitated by the need to accurately control the multi-directional displacement of the rotor blades, i.e., flapwise and edgewise bending, and torsional or pitch change motions. As such, these configurations are termed "Bearingless Rotors" inasmuch as they replace antiquated bearing element rotors which accommodate motion by hinge or journal type bearings at the rotor blade root end. The flexbeam, which is typically comprised of fiber reinforced resin matrix materials, reduces the weight, complexity, and maintenance of the rotor assembly while, furthermore, improving the reliability and damage tolerance thereof.

In the context of a helicopter tail rotor application, the flexbeam is interposed between and secured in combination with a central torque drive hub member and a tail rotor blade assembly. The flexbeam is typically enveloped by a torque tube assembly which is mounted in combination with the outboard end of the flexbeam and which is operative to impart pitch motion to the flexbeam/tail rotor blade assembly. Such pitch motion is imparted to the torque tube by means of a star-shaped pitch beam which is disposed in combination with the inboard end of the torque tube such that linear displacement of the pitch beam effects rotational displacement of the torque tube.

The design of a flexbeam typically involves iteratively examining a multiplicity of interrelated design criteria in view of the chosen composite matrix materials, fiber orientation thereof, design envelope and manufacturing constraints. Such interrelated design criteria include, inter alia, requirements for the flexbeam to 1) accommodate a predefined spectrum of loads and motions, e.g., 30,000–35,000 lbs of centrifugal, 4,000 lbs of thrust, ±14 degrees of pitch motion, ±5 degrees of flap motion, etc. 2) maintain steady and vibratory stresses/strains, i.e., axial, bending, buckling, and torsional, below the maximum static and fatigue stress/strain allowables of the selected material, 3) maintain input control loads, i.e., loads acting on/through the pitch control rods, to acceptable levels, 4) produce desired stiffness attributes to avoid resonant instabilities, 5) occupy a minimal design envelope and 6) facilitate low cost manufacturing. It will be appreciated that many of the above design criteria are competing, i.e., are non-consonant with each other, hence, an iterative trade-study must be performed to optimize the flexbeam.

To accommodate the loads and motions, the flexbeam is typically segregated into various regions wherein each region is designed to perform a principle function. Generally, the flexbeam will comprise at least five such regions including a hub attachment region, an inboard transition region, a pitch region, an outboard transition region and a blade attachment region. As will be discussed hereinbelow, .certain regions of the flexbeam, i.e., the inboard transition and pitch regions, are more highly loaded and more vigorously exercised than other regions, and, accordingly, are more critical to the design of the flexbeam.

The hub attachment region is typically characterized by a thickened rectangular cross-section which is interposed between and mounted to upper and lower clevis plates of a central hub retention member. Functionally, the hub attachment region is principally designed for reacting/transferring centrifugal and bending moment loads, e.g., flapwise and edgewise, acting on the flexbeam. Insofar as the hub attachment region is rigidly affixed to the hub retention member, flexural motion is not a design requirement.

The inboard transition region, also referred to as the flap-flexure region, is principally designed for reacting flapwise and edgewise bending moment loads and for effecting a width and thickness transition between the hub attachment and pitch regions. With regard to the latter, it is typically desirable for such width and thickness transitions to be effected over a relatively short spanwise length so as to minimize the overall length of the flexbeam and maximize the effective length of the pitch region. Furthermore, for tail rotor applications, it is typically desirable to minimize the effective hinge offset, i.e., the distance from the rotational axis of the tail rotor assembly to the "effective" flapping hinge defined by the flexural/stiffness characteristics of the flexbeam. Reduction of the hinge offset diminishes the hub moments acting on the hub attachment region/hub retention member. This is typically achieved by minimizing the width and thickness of the inboard transition region so as to soften the flexbeam, and, consequently, shift the hinge offset to an inboardmost position. Limitations to these objectives relate to high stress concentrations, e.g., interlaminar shear, along the free edges of the flexbeam, which stress concentrations can result in delamination or splintering of the flexbeam.

The pitch region is principally designed to accommodate the requisite pitch motion of the rotor blade assembly, minimize the control loads required to effect pitch control, provide the requisite edgewise buckling stability, and define the chordwise frequency of the flexbeam/rotor blade system. Generally, for tail rotor applications, the pitch region must accommodate about 14 to about 18 degrees of pitch motion which is imparted by means of the torque tube assembly. Concomitantly, the pitch region must be torsionally soft so as to minimize control loads. It will be appreciated that the power requirements to produce the forces required to twist the flexbeam are a function of the torsional stiffness of the flexbeam pitch region. Furthermore, the pitch region must have the requisite edgewise stiffness to withstand steady and vibratory in-plane bending moments induced by aerodynamic drag and/or Coriolis forces. In addition to the load and motion requirements, the pitch region dominates the 1st chordwise frequency attributes of the flexbeam. That is, the flexbeam pitch region must have a characteristic edgewise stiffness which produces a desired chordwise frequency response. Generally, it is desirable to effect a 1st chordwise frequency between harmonic frequencies, corresponding to 1.0, 2.0, or 3.0 cycles/rev. etc., so as to avoid resonant instability due to load amplification.

The outboard transition and blade attachment regions are principally loaded in tension, i.e., due to centrifugal loads, and are lightly loaded as compared to the inboard flexbeam regions. Furthermore, flexural motion is not a design requirement insofar as the inboard transition and pitch regions are principally responsible for accommodating flapwise, edgewise and pitch excursions of the flexbeam/ rotor blade assembly. The outboard transition region also accommodates a width and thickness transition between the pitch and blade attachment regions, however, due to relatively low stresses, i.e., approximately ⅓ the stress levels of the inboard transition region, such width and thickness transitions can occur rapidly without inducing large interlaminar shear stresses.

Prior art flexbeams address the problems associated with delamination or splintering in the inboard transition region by incorporating an external composite overwrap (see Beno et al. U.S. Pat. No. 4,898,515) or edge caps (see Schmaling et al. U.S. Pat. No. 5,431,538) disposed over the free edges to strengthen the composite flexbeam. Furthermore, the inboard transition regions disclosed in these references employ a linear width transition wherein the width transition angle, i.e., the angle defined by the lateral edges of the pitch and inboard transition regions, is shallow, e.g., between about 1.5 to about 3 degrees. Such shallow width transition angle, in combination with the overwrap or edge caps, Affects the necessary reduction in interlaminar stress to obviate splintering or delamination of the composite flexbeam. While the teachings therein provide the requisite structural solutions, it will be appreciated that the weight and manufacturing complexity of the flexbeam is adversely impacted. Furthermore, it will be appreciated that the spanwise length of the inboard transition region must increase to effect a linear transition having a shallow transition angle. Such increased length has the disadvantageous effect of increasing the overall spanwise length of the flexbeam or, conversely, decreasing the effective length of the pitch region. Such decreased effective length complicates the ability to establish the requisite 1st chordwise frequency response and increases the twist rate requirements in the pitch region. With regard to the latter, the increased twist rate induces yet higher stresses/strains, thereby further complicating the design of the pitch region.

A need therefore exists for a composite flexbeam, which is design optimized for reducing interlaminar shear stresses, satisfying 1st chordwise frequency requirements, and minimizing the torsional stiffness of the composite flexbeam.

SUMMARY OF THE INVENTION

It is an object of the present invention to provide an optimized composite flexbeam including an inboard transition region having a unique configuration and combination of materials for reducing interlaminar shear stresses while meeting a variety of interrelated flexbeam design criteria.

It is another object of the present invention to provide such an optimized composite flexbeam which facilitates manufacturing processes capable of producing a high quality composite laminate.

These and other objects of the invention are achieved by an optimized composite flexbeam having a plurality of adjoining regions including a hub attachment region, a blade attachment region, an inboard transition region adjoining the blade attachment region, an outboard transition region adjoining the blade attachment region, and a pitch region disposed between and adjoining the inboard and outboard transition regions.

The inboard transition region includes a first transition subregion defined by a thickness transition and a second transition subregion defined by a width and thickness transition. The second transition subregion defines a width conic and a critical width transition subregion. The critical width transition subregion corresponds to conic slope angles, defined by the width conic, of between 0 degrees to about 10 degrees. Furthermore, the first and second inboard transition regions are composed of a combination of unidirectional and off-axis composite materials wherein the off-axis composite material defines a percentage of off-axis composite material and wherein the percentage in the critical transition subregion is defined by an optimized curve.

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST ODE FOR CARRYING OUT THE INVENTION

The following detailed description defines an optimized composite flexbeam in the context of a helicopter tail rotor assembly, though, it should be appreciated, that the various teachings herein are applicable to flexbeam structures for use in any bearingless rotor e.g., a bearingless main rotor assembly. Moreover, while the exemplary embodiment of the best mode is dimensionally sized for meeting the structural and functional requirements of a tail rotor assembly, it should be understood that various flexbeam modifications may be made for adaptation to other helicopter rotor applications.

Figure 1:
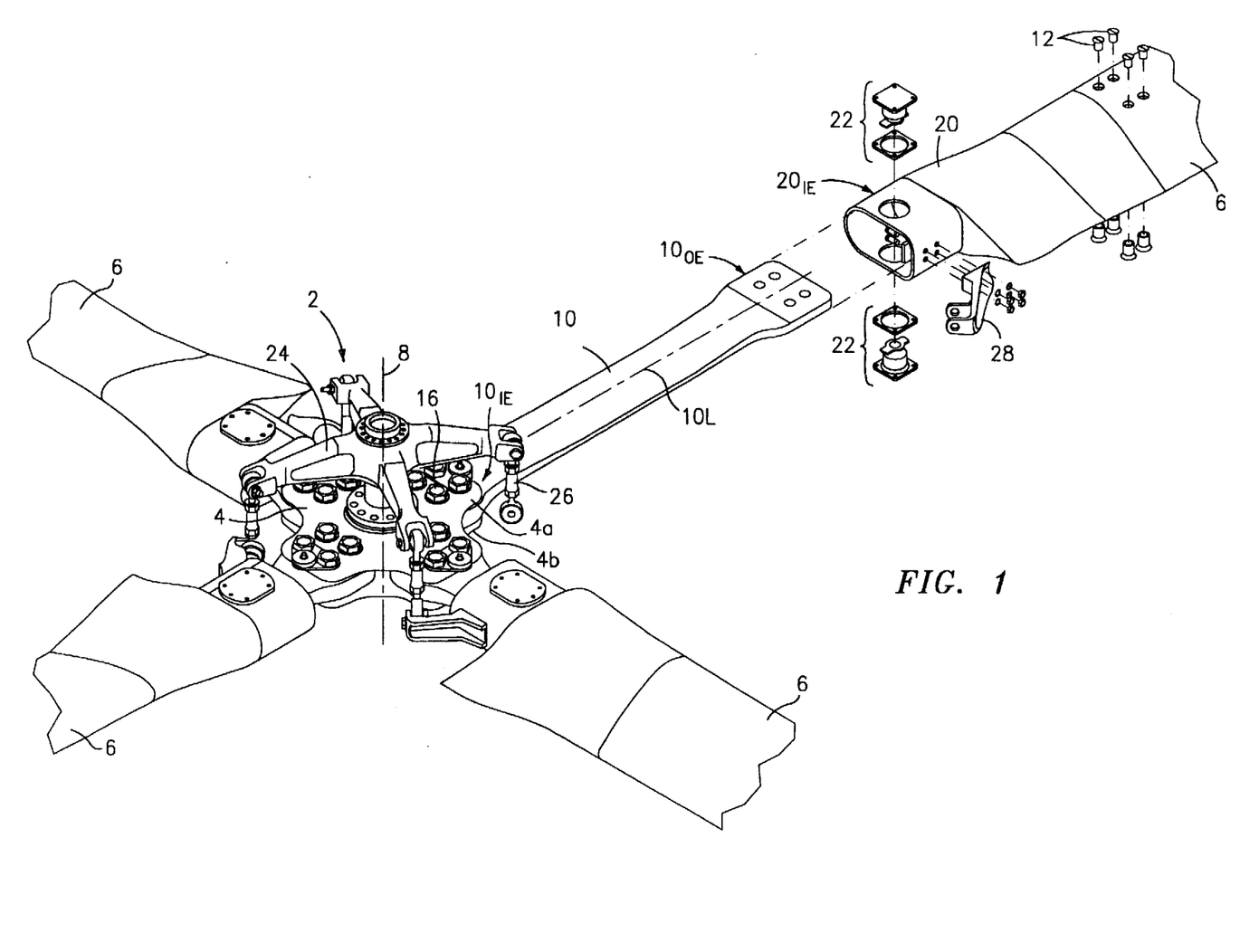
FIG. 1 is a partially exploded perspective view of a helicopter tail rotor assembly including the optimized composite flexbeam of the present invention.

Referring now to the drawings wherein like reference characters identify corresponding or similar elements throughout the several views, FIG. 1 depicts a partially exploded perspective view of a bearingless helicopter tail rotor assembly 2. The tail rotor assembly 2 includes a central hub retention member 4 for driving a plurality of tail rotor blades 6 about an axis of rotation 8. More specifically, an optimized composite flexbeam 10 according to the present invention is interposed between and secured in combination with the hub retention member 4 and each tail rotor blade 6. Connecting bolts 12 secure the outboard end $10_{OE}$ of the optimized flexbeam 10 to the respective tail rotor blade 6 and connecting bolts 16 affix the inboard end $10_{IE}$ of the flexbeam 10 to upper and lower clevis arms 4a and 4b, respectively, of the hub retention member 4.

Each optimized flexbeam 10 is enveloped by a torque tube 20 which is mounted in combination with the outboard end $10_{OE}$ of the flexbeam 10 via the same connecting bolts 12 employed for effecting the flexbeam/tail rotor blade attachment. The torque tube 20 is, furthermore, articulately mounted at an inboard end $20_{IE}$ by means of an elastomeric bearing assembly 22, also referred to as a snubber bearing assembly, which performs the functions of centering the torque tube 20 about the optimized flexbeam 10, accommodating relative pitch, flap and lead-lag motion between the torque tube 20 and the optimized flexbeam 10, and for transferring pitch control and other loads therebetween. Such snubber bearing assemblies 22 are well-known in the art and are further described in U.S. Pat. Nos. 5,092,738, and 5,499,903.

The torque tube 20 is operative to impart pitch motion to the corresponding tail rotor blade assembly 6, which pitch motion, in addition to other blade excursions, is accommodated by the torsional elasticity of the optimized flexbeam 10. More specifically, pitch motion is imparted to the torque tube 20 by means of a star-shaped pitch beam 24 which is disposed in combination with the inboard end $20_{IE}$ of each torque tube 20 via a pitch control rod 26 and pitch horn fitting 28. In operation, linear displacement of the pitch beam 24 effects rotational displacement of each torque tube 20, which, in turn, imparts .pitch control inputs to the corresponding tail rotor blade 6.

Before discussing the optimized composite flexbeam 10 in detail, it should be understood that the described embodiment is based upon a tail rotor assembly having certain predefined load and motion requirements. Each optimized flexbeam 10 described herein a) reacts 33,000 lbs (146,784 N) of centrifugal load generated by each tail rotor blade assembly, b) reacts steady and vibratory flapwise bending loads (produced by rotor blade thrust) of about 15,000 in-lbs (1,695 N-m) steady and about ±38,000 in-lbs (4,293 N-m) vibratory, c) transfers steady and vibratory edgewise bending loads (associated with rotor torque) of about 8,000 in-lbs (904 N-m) steady and about ±21,000 in-lbs (2,373 N-m) vibratory, d) accommodates ±5 degrees of out-of-plane (flapwise) motion, e) accommodates ±18 degrees of pitch motion while maintaining pitch control loads below ±200 lbs, f) produces a hub moment constant of 1,250 ft-lbs/deg. (97,106 N-m/rad.), and g) produces a 1st chordwise frequency of about 1.7 cycles/rev. It will be appreciated that various modifications to the optimized composite flexbeam 10, e.g., the length, cross-sectional area, severity of width and/or thickness transition etc., may be made within the spirit and scope of the invention.

Additional variables which influence the configuration of the optimized flexbeam 10 include the selection of materials and the mechanical properties thereof, e.g., the elastic modulus of the fiber reinforcement, the fiber orientation thereof, the shear modulus of the resin matrix, and the stress and strain allowables of the composite material etc. For the described embodiment, the optimized composite flexbeam 10 comprises fiber reinforced resin matrix materials wherein the fibrous reinforcement includes both graphite and fiberglass fibers and wherein the resin matrix is a toughened epoxy matrix. More specifically, the optimized flexbeam 10 includes a plurality of graphite or fiberglass composite plies which are stacked and arranged to form a laminated composite structure having anisotropic/orthotropic strength properties, i.e., a structure having predefined stiffness properties along orthogonal axes as a function of the orientation of the fiber reinforcement. Such strength properties are effected by a select combination of unidirectional and/or off-axis composite material. In the context used herein, unidirectional material is characterized by its fiber reinforcement being substantially parallel to the longitudinal axis $10_L$ of the optimized composite flexbeam 10, i.e., about 0 degrees relative thereto, and off-axis composite material is characterized by its fiber orientation being about +45 degrees or −45 degrees relative to the longitudinal axis $10_L$. Furthermore, reference to unidirectional and/or off-axis "material", "fiber", or "plies" will be used interchangeably to denote the directional strength of the composite laminate. While the relative placement and fiber orientation of the resulting graphite/fiberglass composite laminate are, inter alia, essential features of the invention, it should be understood that other composite matrix materials may be employed provided that such materials have similar mechanical properties, e.g., elastic and shear moduli, stress/strain allowables, etc.

Figure 2A:
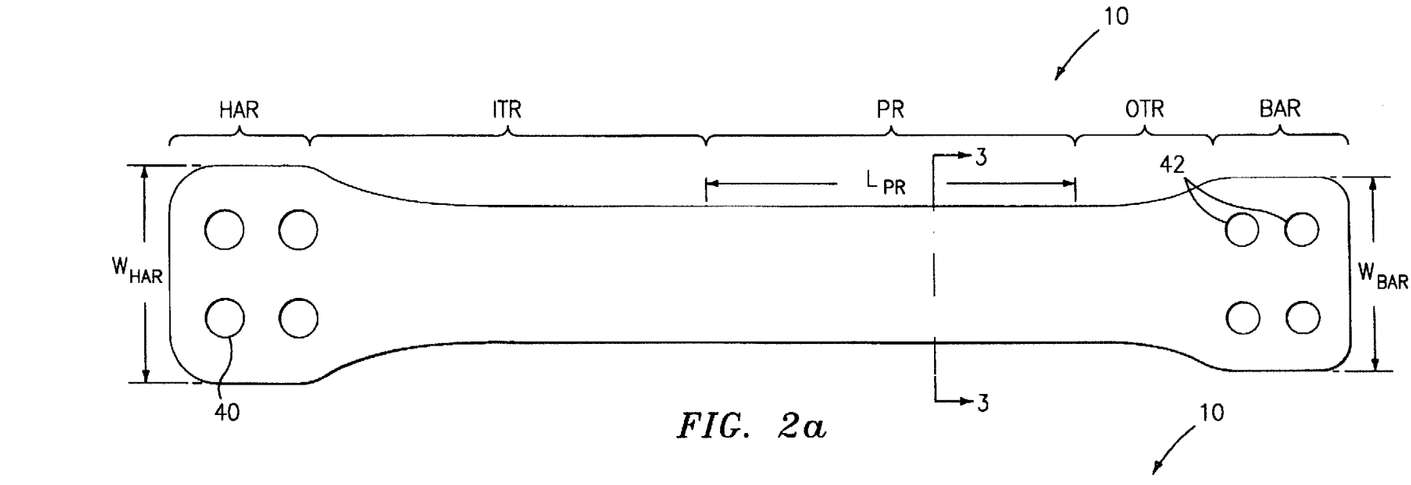
FIGS. 2a and 2b are plan and side views of the optimized composite flexbeam for depicting various adjoining regions thereof including a hub attachment region, an inboard transition region, a pitch attachment region, an outboard transition region, and a blade attachment region.
Figure 2B:
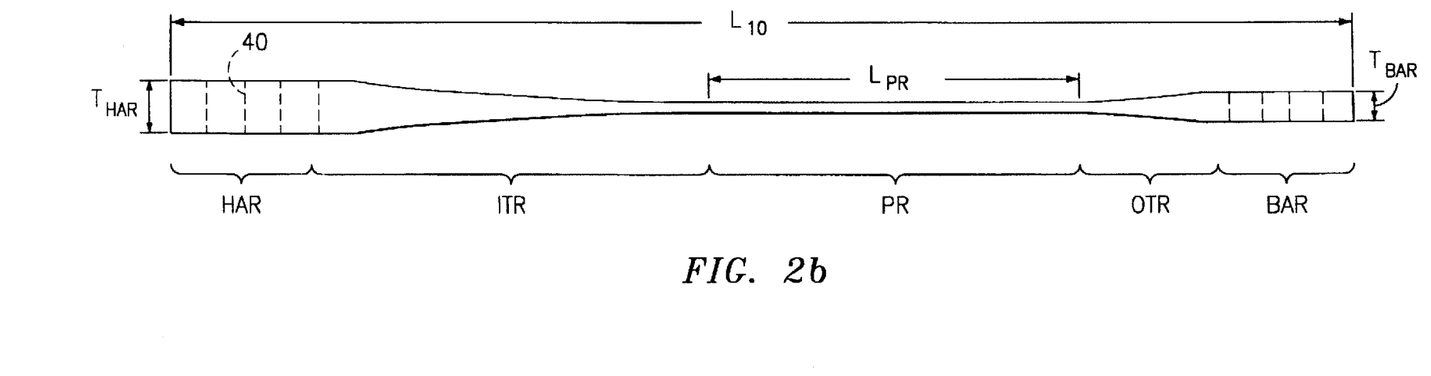

In FIGS. 2a and 2b, the optimized composite flexbeam 10 according to the present invention is segmented into various adjoining regions for the purpose of identifying particular structural and functional attributes thereof. More specifically, the composite flexbeam 10 comprises: a hub attachment region HAR, a blade attachment region BAR, a pitch region PR, and inboard and outboard transition regions, ITR and OTR, respectively. The following discussion addresses the primary functions, structural attributes and composite construction of each region. While a primary function of the optimized flexbeam 10, and, accordingly, all regions thereof, is the reaction of blade-induced centrifugal loads, the principle functions of each region will be described in terms of unique functions which are specific thereto.

The hub attachment region HAR is configured to accommodate securement of the composite flexbeam 10 in combination with the hub retention member and, more specifically, includes a spaced pattern of mounting apertures 40 for effecting the bolted connection illustrated in FIG. 1. Functionally, the hub attachment region HAR is primarily designed to transfer flexbeam moments, i.e., flapwise and edgewise bending moments, and centrifugal loads to the hub retention member. Insofar as the hub attachment region HAR is rigidly affixed to the hub retention member, significant flexural motion is not a design requirement. The hub attachment region HAR is characterized by a constant width and thickness dimension, $W_{HAR}$ and $T_{HAR}$, respectively, and is principally comprised of a 50/50 admixture of off-axis and unidirectional graphite material, though, a small percentage of fiberglass material (both unidirectional and off-axis material) is present to facilitate the desired composite lay-up in the pitch region and inboard transition regions PR, ITR. The off-axis and unidirectional composite material produces an anisotropic composite laminate which provides optimum transfer of flexbeam loads into the connecting bolts.

The blade attachment region BAR is configured to secure the optimized composite flexbeam 10 to each tail rotor blade assembly and, concomitantly, to the torque tube 20, by means of mounting apertures 42 for effecting the outboard bolted attachment of FIG. 1. Functionally, the blade attachment region BAR is principally designed to react centrifugal loads and transfer torque to the rotor blade assembly. Insofar as bending moments are small, the blade attachment region BAR is lightly loaded as compared to other regions of the optimized composite flexbeam 10. The characteristics regarding its composite construction, e.g., width and thickness $W_{BAR}$, $T_{BAR}$, admixture of off-axis and unidirectional composite material, etc., are the same as for those of the hub attachment region HAR.

The pitch region PR is situated between the hub and blade attachment regions HAR, BAR and is structurally configured to (i) accommodate the requisite pitch motion of the tail rotor blade assembly i.e., the elastic torsional displacement due to pitch inputs, (ii) minimize the control loads required to effect pitch control, (iii) provide the requisite buckling stability, and (iv) define the 1st chordwise frequency response of the flexbeam/tail rotor blade system. More specifically, the pitch region PR incorporates a select combination of composite material and a unique cross-sectional configuration to satisfy the aforementioned design requirements.

Figure 3:
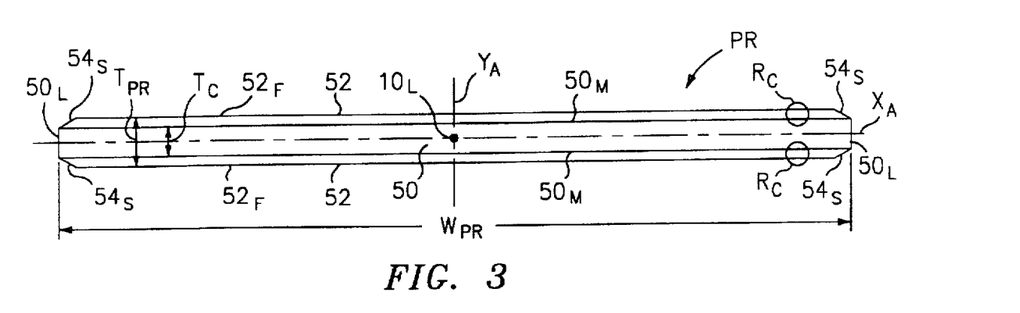
FIG. 3 is a cross-sectional view taken substantially along line 3—3 of FIG. 2a for revealing the internal construction and cross-sectional configuration of the pitch region.

The pitch region PR is characterized by a substantially constant cross-sectional geometry along its length $L_{PR}$. In FIG. 3, the pitch region comprises a core laminate 50 of unidirectional fiberglass material and face laminates 52 of unidirectional graphite material bonded to upper and lower mating surfaces $50_M$ defined by the core laminate 50. Preferably, the face laminates 52 of graphite material extend substantially the full width dimension $W_{PR}$ of the pitch region defined by the lateral surfaces $50_L$ of the core laminates 50. Furthermore, the width dimension $W_{PR}$, in combination with the pitch region thickness dimension $T_{PR}$ measured between the upper and lower face surfaces $52_F$ of the face laminates 52, define a width to thickness ratio $W_{PR}/T_{PR}$, hereinafter referred to as the aspect ratio of the pitch region 34. The aspect ratio is preferably greater than or equal to 10 and, more preferably, between a range of about 10 to about 20. For the described embodiment, the aspect ratio is about 16.2. The import of the such composite materials and the aspect ratio will be discussed in subsequent paragraphs.

The unidirectional orientation of the fiberglass and graphite material of the core and face laminates 50, 52, respectively, produces a laminate having orthogonal properties wherein the torsional stiffness is principally a function of the shear moduli (G) of the resin matrices and wherein the axial or bending stiffness is principally a function of the elastic modulus (E) of the fibers. Consequently, the pitch region PR is characterized by a low torsional stiffness about the longitudinal axis 10L of the composite flexbeam due to the relatively low shear moduli (G) of the resin matrices and a high axial stiffness due to the high elastic modulus ($E_G$) Of the unidirectional fibers, and particularly, the graphite fibers. With regard to the former, the low torsional stiffness produces a torsionally compliant pitch region PR which minimizes control loads, i.e., reduces the forces required to twist the optimized flexbeam about the longitudinal axis $10_L$. With regard to the latter, and referring to the encircled regions $R_C$, the graphite fibers therein are distally spaced from the flapwise and bending neutral axes $X_A$, $Y_A$ and, accordingly, are highly effective in providing both flapwise and edgewise bending stiffness. Such high flapwise and edgewise bending stiffness provides in-plane buckling stability about the edgewise bending neutral axis $Y_A$.

While the graphite face laminates 52, and, in particular, the edgewise stiffness component thereof, contributes, in large part, to the 1st chordwise frequency response of the optimized flexbeam 10, the low elastic modulus (E) of the fiberglass core laminate 50 serves to ameliorate the stiffening effects of the graphite face laminates 52. More specifically, the percentage of fiberglass material in the pitch region PR is preferably between a range of about 50% to about 70% of the total material, and, more preferably, is between about 50% to about 60% of the total material. For the described embodiment, the percentage of fiberglass is about 59%. Insofar as the width dimension $W_{PR}$ of the laminates 50, 52 is essentially equal, the ratio of the core thickness dimension $T_C$ to the pitch region thickness dimension $T_{PR}$ also defines the percentage of fiberglass material. Such material or thickness range, in combination with the above described aspect ratio, produces a 1st chordwise frequency response of about 1.7 cycles/rev. Material or thickness ranges below the prescribed range, i.e., 50%, produces a 1st chordwise frequency response above about 1.9 cycles/rev which, as discussed in the Background of the Invention, may result in resonant instability if positioned at or near a load amplification value e.g., 2.0 cycles/rev or, alternatively, produce high control loads if positioned between load amplification values, e.g., between 2.0 and 3.0 cycles/rev. The upper end of the material or thickness percentage range, i.e., 70%, is limited by the in-plane fatigue shear stress allowable of the fiberglass material.

In addition to the combination of materials, material thickness' and aspect ratio described above, the pitch region PR is characterized by chamfered edge surfaces $54_S$ to reduce interlaminar shear stresses along the lateral surfaces $50_L$ of the core laminates. Such interlaminar shear stresses are introduced therein as a result of the aspect ratio of the pitch region PR and the maximum in-plane shear stresses developed along the face surfaces $52_F$ of the graphite face laminates 52. Additional detailed description of the structural benefits derived from the chamfered edge surfaces $54_S$ may be found in co-pending, commonly-owned U.S. Patent Application entitled "Optimized Composite Flexbeam for Helicopter Tail Rotors" (Docket No. S-5219).

Figure 4:
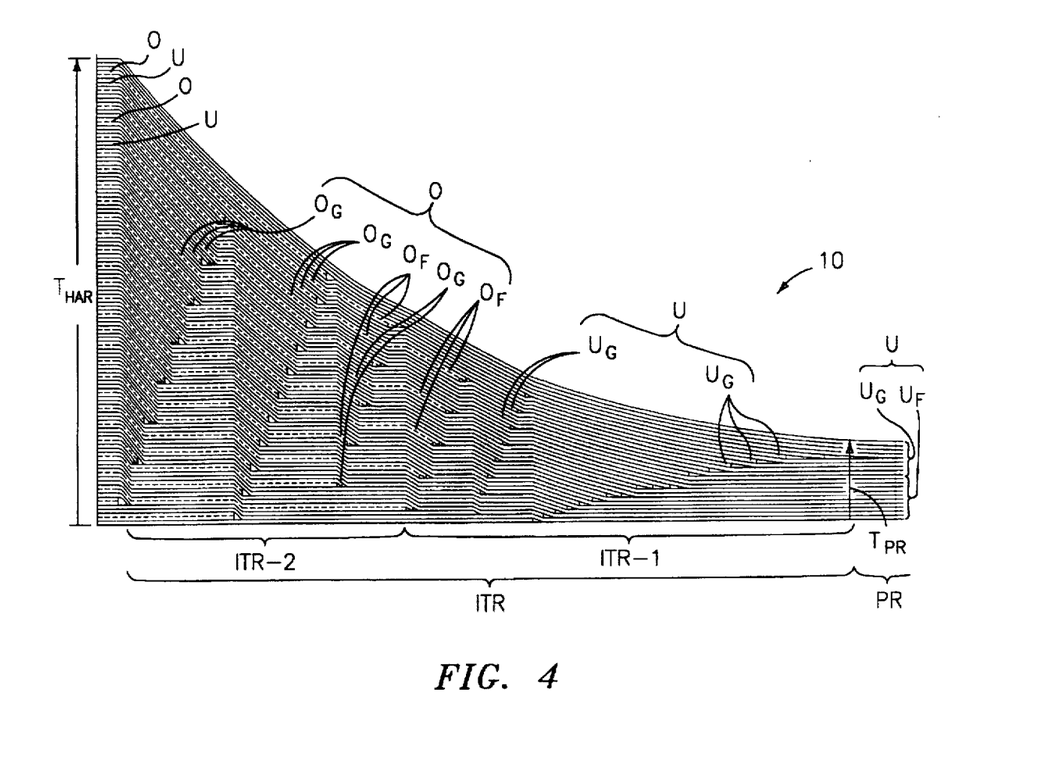
FIG. 4 is a schematic partially broken-away side view of the pitch, inboard transition and hub attachment regions of the optimized flexbeam for illustrating, inter alia, the composite ply lay-up and thickness variations therein.

In FIG. 4, a schematic partially sectioned side view of the optimized flexbeam 10 is depicted for illustrating the composite ply lay-up and thickness variation therein. For ease of illustration, only the upper half of the optimized flexbeam 10 is shown, i.e., from a mid-plane thereof, insofar as the lower half is essentially identical. Accordingly, references to the thickness dimensions should be viewed as being twice (i.e., 2X) the actual dimensions shown. Furthermore, the space between solid lines is indicative of unidirectional composite material U, and the space between solid and dashed lines is indicative of off-axis composite material O.

The unidirectional composite material U, i.e., the fiberglass and graphite plies $U_F$, $U_G$. Of the face and core laminates 50, 52, extend the full length L of the pitch region PR (see FIG. 2b) and, preferably, extend the full spanwise length $L_F$ of the optimized composite flexbeam 10. In the described embodiment, these plies U are interleaved with additional unidirectional and off-axis material, O and U, respectively, in the adjacent regions to effect the requisite thickness transition in the inboard and outboard transition regions ITR, OTR.

Figure 5A:
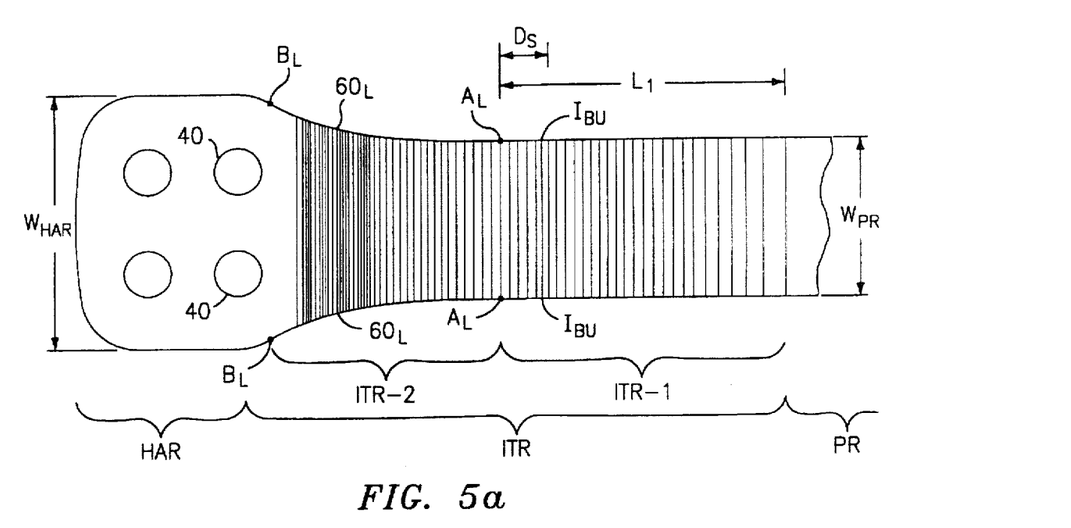
FIG. 5a is a partial plan view of the pitch, inboard transition and hub attachment regions of the optimized composite flexbeam for illustrating, inter alia, a width conic defined by lateral surfaces of the inboard transition region.
Figure 5B:
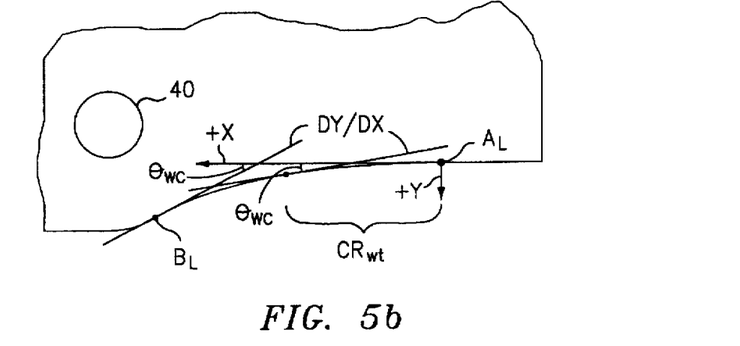
FIG. 5b is a detailed broken view of the width conic and a critical width transition subregion defined by a range of conic slope angles.

In FIGS. 4, 5a and 5b, the inboard transition region ITR effects a width and thickness transition between the hub attachment region HAR and the pitch region PR. Such width and thickness transitions are typically dictated by (i) the low torsional stiffness and 1st chordwise frequency requirements of the pitch region PR and (ii) the load transfer requirements of the hub attachment region HAR. With regard to the former, the stiffness and frequency requirements of the pitch region PR, in the main, necessitate that the pitch region width and thickness dimensions $W_{PR}$, $T_{PR}$ be minimized to reduce the torsional stiffness ($\frac{1}{3}W_{PR}T_{PR}^3*G$) and the edgewise bending stiffness ($\frac{1}{12}W_{PR}^3T_{PR}*E$) of the pitch region PR. And, regarding the latter, the requirement of the hub attachment region HAR to transfer all flexbeam loads via differential bending across the connecting bolts necessitates that predefined minimum edge distances be maintained, i.e., for the mounting apertures 40 of the hub attachment region HAR to a free edge thereof. As such, the thickness $T_{HAR}$, and, particularly the width dimension $W_{HAR}$ of the hub attachment region HAR, are typically larger than the comparable dimensions $W_{PR}$, $T_{PR}$ of the pitch region PR. In the described embodiment, a 58% width transition, i.e., from 3.8 in (9.7 cm) to 6.0 in (15.2 cm) and a 503% thickness transition, i.e., from 0.234 in (0.59 cm) to 1.410 in (3.58 cm), is effected from the pitch region PR to the hub attachment region HAR.

To more accurately define its configuration and function, the inboard transition region ITR is subdivided into various subregions including first and second transition subregions ITR-1 and ITR-2, respectively. The first transition subregion ITR-1, effects a thickness transition while the second transition subregion ITR-2 effects both a width and thickness transition. The first transition subregion ITR-1 is multifunctional insofar as it accommodates thrust-induced flapwise displacement, reacts flapwise and edgewise bending loads, and shares a portion of the pitch displacement of the optimized flexbeam (albeit small compared to the pitch region PR). The functionality thereof is effected by the gradual addition of unidirectional composite material U, having a constant width (equal to the width dimension $W_{PR}$ of the pitch region PR) so as to increase the thickness of the flexbeam 10 without appreciably increasing the torsional and edgewise stiffness thereof. Accordingly, the gradual thickness transition accommodates flapwise displacement while increasing the flapwise bending stiffness to react the imposed bending loads. Furthermore, the unidirectional orientation of the composite material U, in combination with the width constraint, permits a small degree of pitch motion, thereby reducing the twist rate requirements of the pitch region PR. For the described embodiment, the unidirectional composite material U comprises a plurality of unidirectional graphite plies $U_G$, which are interleaved with the unidirectional graphite and fiberglass plies $U_G$, $U_F$ of the pitch region PR.

The second transition subregion ITR-2 is principally designed for reacting flapwise and edgewise bending loads and accommodating the thrust-induced flapwise displacement of the tail rotor blade. In addition to these functional requirements, the second transition subregion ITR-2 reduces the interlaminar shear stresses along the free edges of the optimized composite flexbeam. More specifically, the second transition subregion ITR-2 defines lateral surfaces, $60_L$ each having a substantially conic shape. The conic shape may take a variety of forms including parabolic, hyperbolic, elliptical or circular curve shapes. With respect to either of the lateral surfaces $60_L$, the conic shape, hereinafter referred to as the "width conic", is initiated at a point $A_L$ corresponding to the juncture of the first and second transition subregions ITR-1, ITR-2 and terminates at a point $B_L$, corresponding to the juncture of the second transition subregion ITR-2 and the hub attachment region HAR. Furthermore, and referring to FIG. 5b, the width conic defines a conic slope angle $\theta_{wc}$ at various points therealong and is given by a standard transcendental function:

$$\theta_{wc} = \text{Tan-1}(DY/DX)$$

wherein DY/DX is the width conic slope at a particular point relative to an X-Y-coordinate system. The X-axis thereof is parallel to the longitudinal axis (not shown in FIG. 5b) of the optimized flexbeam 10 and the Y-axis intersects point $A_L$ of the width conic. The slope angle $\theta_{WC}$ of the width conic at point $A_L$ is 0 degrees and increases to between about 30 to about 50 degrees at the terminal point $B_L$.

The inventors discovered that interlaminar shear stresses are significantly reduced by introducing off-axis composite material O, in combination with unidirectional composite material U, as a function of the conic slope angle $\theta_{wc}$. The relationship is independent of the fiber composition, i.e., graphite or fiberglass, though, for the described embodiment, a combination of off-axis graphite and fiberglass plies $O_G$, $O_F$, are employed to alleviate thermally induced stresses. Such stresses may develop as a result of a thermal mismatch, during cure operations, between unidirectional fiberglass and graphite plies $U_F$, $U_G$ and off-axis graphite plies $O_G$. Accordingly, it may be desirable to introduce off-axis fiberglass plies $O_F$ therebetween, which off-axis fiberglass plies $U_F$ are characterized by a thermal expansion coefficient which is more compatible with the unidirectional plies $U_F$, $U_G$ and the off-axis graphite plies $O_G$.

Before defining the relationship, it should be appreciated that the percentage of off-axis material O must increase by at least 50% from the pitch transition region PR to the hub attachment region HAR. This percentage increase is necessary inasmuch as the pitch region PR, as discussed hereinabove, is comprised solely of unidirectional composite material U while the hub attachment region requires a 50/50 admixture of off-axis and unidirectional materials O, U for optimally transferring loads through the bolted attachment. Furthermore, while the build-up of off-axis composite material O is initiated in the first transition subregion ITR-1 and is maximum, i.e., 50%, in the second transition subregion ITR-2, the percentage of off-axis composite material O is most critical in areas $CR_{wt}$ corresponding to shallow angles $\theta_{wc}$ of conic slope, i.e., between about 0 degrees to about 10 degrees of conic slope. This area $CR_{wt}$ which corresponds to the outboard portion of the second transition subregion ITR-2, is hereinafter referred to as the critical width transition subregion $CR_{wt}$ In FIG. 6, an optimized curve 70 having upper and lower limit boundaries $70_U$ and $70_L$ defines the percentage O% of off-axis composite material O, i.e., percentage of the total off-axis plies $O_G$, $O_F$ relative to the total material composition, at a given cross-section as a function of the conic slope angle $\theta_{wc}$. The optimized curve 70 is defined for slope angles $\theta_{wc}$ between 0 and 10 degrees wherein the interlaminar shear stresses developed in the critical transition subregion $CR_{wt}$ are highest. While the build-up of off-axis composite material O outboard and inboard of the critical width transition subregion is less critical, such build-up is preferably gradual to avoid high axial strains which are geometrically induced, i.e., caused by abrupt contour changes.

Figure 6:
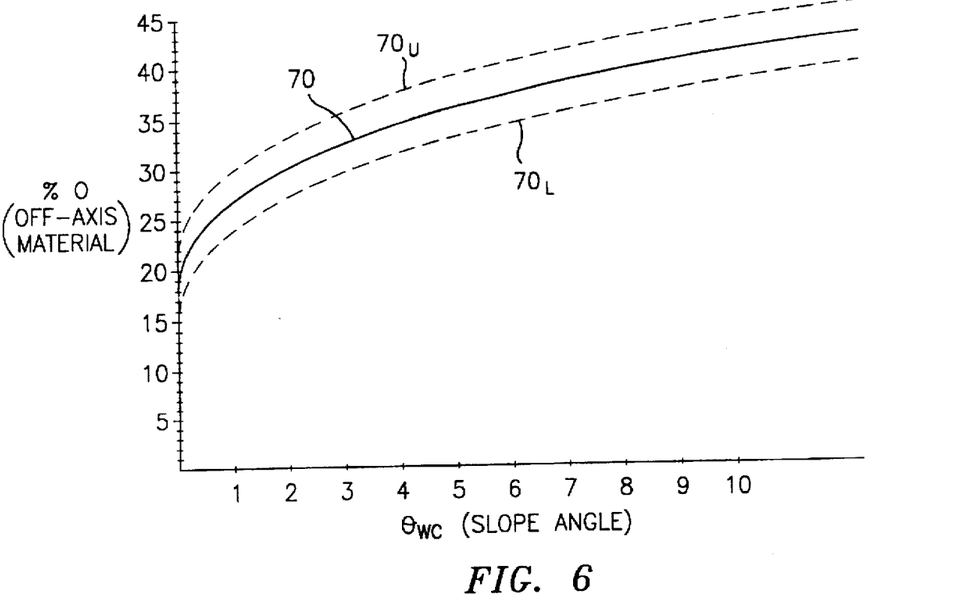
FIG. 6 is a graph of the percent off-axis composite material in the critical width transition subregion as a function of the conic slope angle.

The optimized curve 70 is defined by the expression:

$$\% O = C + \sqrt{900 - [k\theta_{wc} - 30]^2}$$

wherein the constant C is between about 14.4 to about 21.6 and defines the range of Y-intercept values of the optimized curve 70, wherein the slope angle $\theta_{wc}$ is in degrees, and wherein k is a constant equal to 1.0 degrees$^{-1}$ to provide consistency of units in the expression. It will be apparent from the expression that the constant C also defines the upper and lower limit boundaries $70_U$ and $70_L$ of the optimized curve 70.

From the expression it will be appreciated that the percentage of off-axis composite material O%, corresponding to zero slope is between about 14.4% to about 21.6% and is about 35.4% to about 42.6% at 10 degrees of conic slope. The build-up of off-axis composite material O necessary to effect such percentage in the critical transition subregion $CR_{wt}$ i.e., at the Y-intercept of the optimized curve 70, is initiated in the first transition subregion ITR-1 at a radially outboard spanwise position $I_{BU}$ (see FIG. 5a). Preferably, the spanwise position $I_{BU}$ corresponds to a dimension $D_s$ from the junction of the first and second transition subregions ITR-1, ITR-2, which dimension $D_S$ is about 15% to about 25% of the spanwise length $L_1$ of the first transition subregion ITR-1. This position $I_{BU}$ ensures that the twist rate is not adversely affected and that the off-axis material O may be gradually increased to effect the minimum off-axis material O in the critical transition subregion $CR_{wt}$. The build-up of off-axis composite material O beyond the critical transition subregion $CR_{wt}$, i.e., inboard thereof, may be more rapid insofar as interlaminar shear stresses are relatively benign and, consequently, the precise thickness transition therein is less critical. While the optimized curve 70 and its limit boundaries $70_U$ and $70_L$ are depicted as smooth curvilinear functions, it should be understood that, in practice, the curve 70 will be a stepped function due to the incremental thickness build-up of individual off-axis plies $O_G$, $O_F$.

Figure 7:
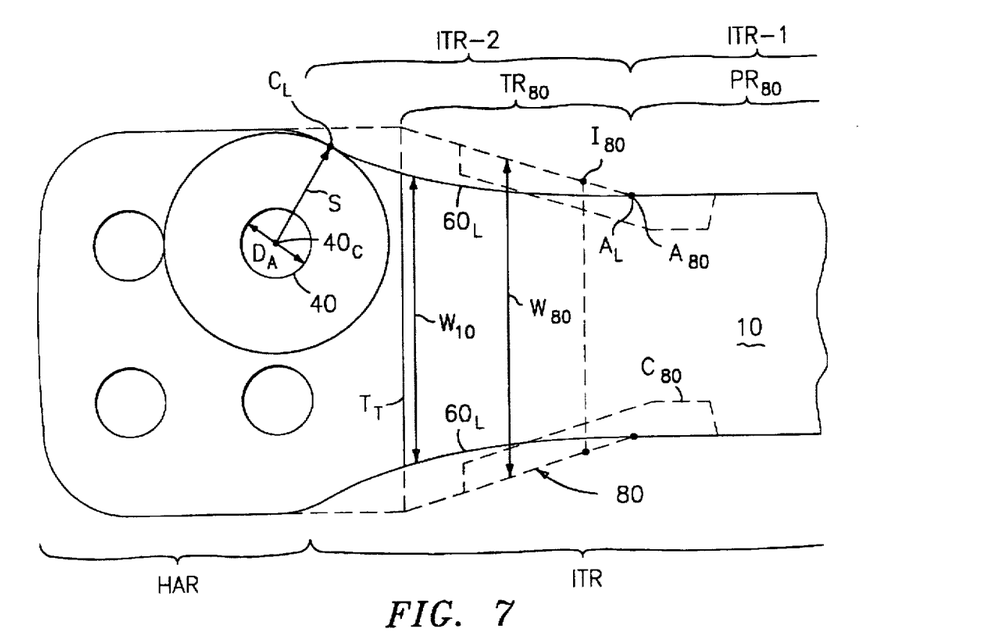
FIG. 7 depicts a schematic partially broken-away plan view of a prior art composite flexbeam overlaying the optimized composite flexbeam of the present invention for comparing and contrasting the various features thereof.

In FIG. 7, a prior art flexbeam 80, is shown in phantom and overlaying the optimized composite flexbeam 10 of the present invention for illustrating the benefits derived from the configuration and construction of the inboard transition region ITR. The prior art flexbeam 80 is characterized by a linear width and thickness transition region $TR_{80}$ and a uniform build-up of off-axis composite material. With regard to the latter, such build-up is typically effected at a spanwise position $I_{80}$ which is radially inboard of the initial width transition corresponding to point $A_{80}$. Such initial placement of off-axis composite material serves to maximize the effective length of the pitch region $PR_{80}$. By analysis it can be shown that interlaminar shear stresses at point $A_{80}$ of the prior art flexbeam 80 are 2 to 3 times higher than the comparable interlaminar shear stresses at point $A_L$ of the optimized flexbeam 10. Such high stress levels are developed as a result of the high slope angle and inboard placement of the off-axis composite material. As discussed in the Background of the Invention resort has been made to edge caps $C_{80}$ or composite overwraps (not shown) to reduce interlaminar shear stresses to acceptable levels. The inboard transition region ITR of the optimized flexbeam 10 eliminates the weight, cost and complexity of such additional structure by the combined structural effects of the width conic and the optimized build-up of off-axis composite material. The width conic effects a gradual width transition while the off-axis composite material provides the requisite shear strength to reduce interlaminar shear stresses along the lateral surfaces $60_L$ of the second transition subregion ITR-2.

In addition to these structural benefits, the configuration and construction of the inboard transition region ITR effects a reduction in the edgewise and torsional stiffness of the optimized composite flexbeam 10 while, concomitantly, increasing the effective length of the regions/subregions responsible for accommodating pitch motion, i.e., the pitch region PR and first transition subregion ITR-1. By comparing the mean width dimension $W_{80}$ of the prior art flexbeam 80 to the mean width dimension $W_{10}$ of the optimized flexbeam and the respective locations of each, it will be apparent that area and polar moments of inertia (I and J) are reduced, thereby minimizing the overall edgewise and torsional stiffness of the optimized flexbeam 10. As such, the inboard transition region ITR permits greater design flexibility with respect to (i) establishing the desired 1st chordwise frequency of the optimized flexbeam 10 (ii) reducing control loads required to impart pitch motion to the optimized flexbeam 10 and/or (iii) reducing the length and/or weight thereof.

To further reduce the edgewise and torsional stiffness of the optimized flexbeam 10, it may be desirable to locate the width conic as close as practicable to the mounting apertures 40 of the hub attachment region HAR such that the width conic continues radially inboard of a thickness juncture $T_T$ defined by the terminus of the thickness transition. More specifically, it is desirable to cause a point $C_L$ disposed along the width conic to be within an $S/D_A$ range of about 1.60 to about 1.85 wherein S is the distance from the point $C_L$ to the geometric center $40_C$ of the nearest mounting aperture 40 and $D_A$ is the diameter of the respective mounting aperture 40. As such, the spatial position of the width conic may be shifted inwardly toward the mounting apertures 40, thereby causing the mean width dimension $W_{10}$ to be positioned at an inboardmost radial location.

Figure 8:
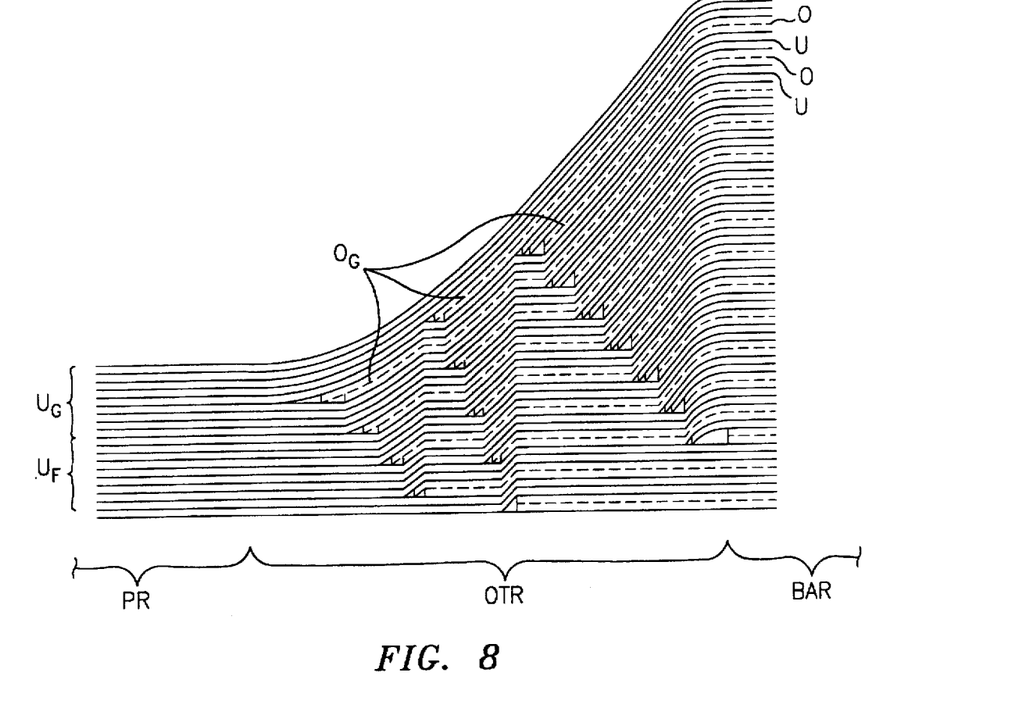
FIG. 8 is a schematic partially broken-away side view of the pitch, outboard transition and blade attachment regions of the optimized flexbeam for illustrating, inter alia, the composite ply lay-up and thickness variations therein.

In FIG. 8, the outboard transition region OTR accommodates a width and thickness transition between the pitch region PR and the blade attachment region BAR. The outboard transition region OTR is principally designed for reacting centrifugal loads and may be characterized as lightly-loaded in comparison to the inboard transition region. That is, loads acting on the outboard transition region OTR are about ⅓rd of those acting on the inboard transition region. Insofar as the loads are less demanding, the width and thickness transitions can occur rapidly without inducing high interlaminar shear stresses. In the described embodiment, off-axis graphite plies $O_G$ are disposed in interleaved combination with the unidirectional fiberglass and graphite plies $U_F$, $U_G$ of the pitch region so as to effect a rapid, conic-shaped thickness transition. Furthermore, sufficient off-axis graphite plies $O_G$ are introduced to effect a 50/50 admixture of unidirectional and off-axis composite material U, O in the blade attachment region BAR.

Figure 9:
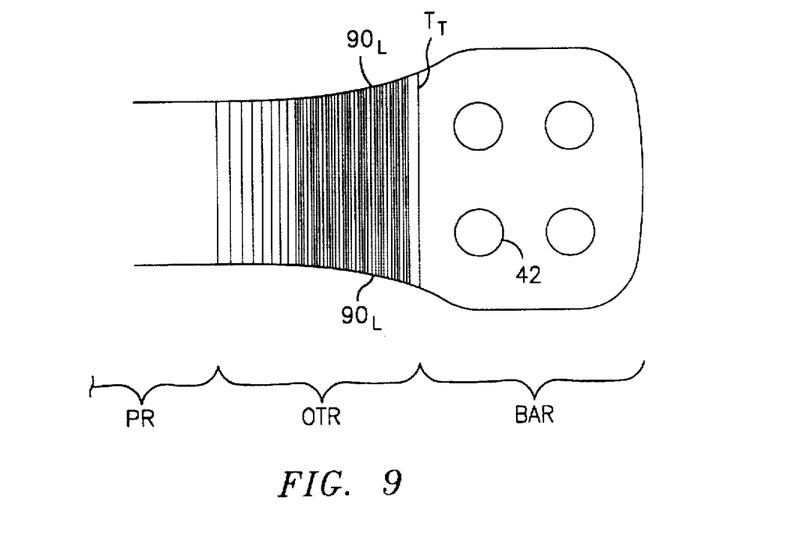
FIG. 9 is a partial plan view of the pitch, outboard transition and blade attachment regions of the optimized composite flexbeam.

In FIG. 9 the outboard transition region is characterized by many of the same features of the inboard transition region ITR. For example, the lateral surfaces $90_L$ of the outboard transition region OTR define a conic shape which are disposed in close proximity to the mounting apertures 42 of the blade attachment region BAR, i.e., inboard of the thickness juncture $T_T$. As discussed earlier, these features, inter alia, increase the effective length of the pitch region PR, reduce interlaminar shear stresses and reduce weight.

Figure 10:
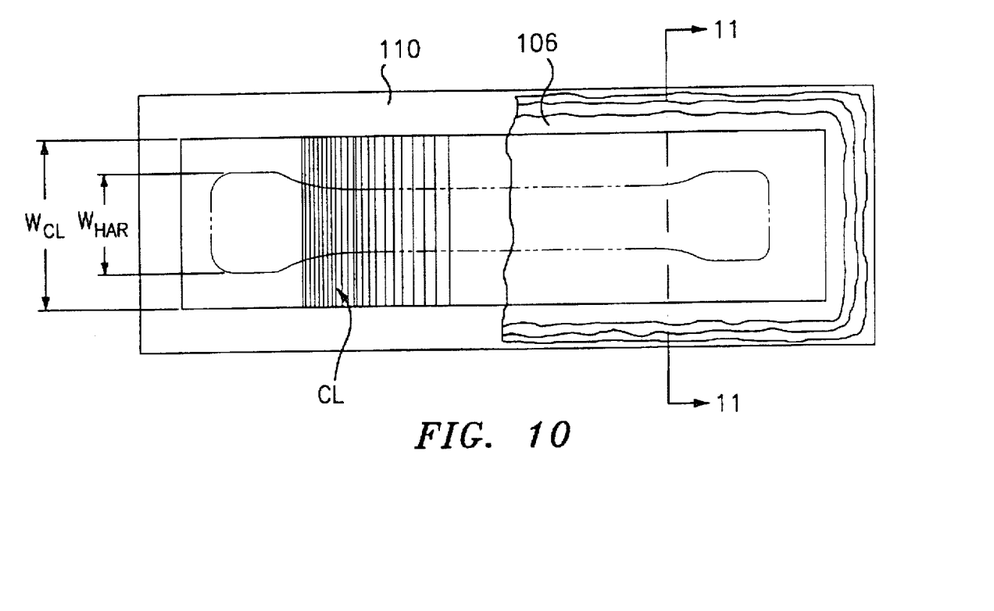
FIG. 10 is a partially broken-away plan view of a mold assembly used for fabricating the optimized composite flexbeam.
Figure 11:
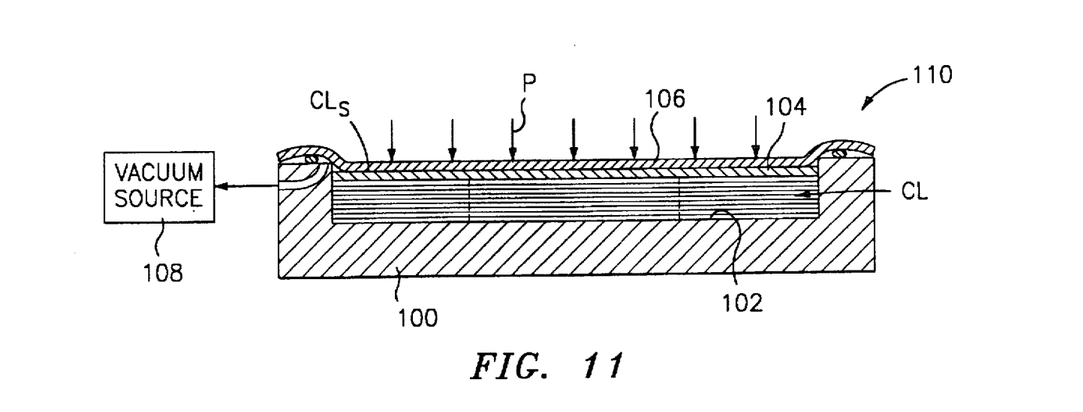
FIG. 11 is a cross-sectional view taken substantially along line 11—11 of FIG. 10.

The optimized composite flexbeam 10 of the present invention may be manufactured by conventional manufacturing techniques including vacuum forming, press molding and resin transfer molding. In the preferred embodiment, a vacuum forming process is employed for curing the composite material U, O of the optimized flexbeam. More specifically, and referring to FIGS. 10 and 11, a composite lay-up CL is produced by placing, i.e., either by hand or via a numerically controlled tape lay-up head, uncured plies of resin impregnated unidirectional and off-axis composite material in a base metal mold 100 which defines a face surface 102 of the optimized flexbeam 10. Furthermore, the unidirectional and off-axis material is laid so as to define the thickness dimensions of the optimized composite flexbeam. The width dimension $W_{CL}$ is initially oversized relative to the final net shaped flexbeam 10, and, preferably, the width dimension $W_{CL}$ is oversized by about 30% to about 50% relative to the width dimension $W_{HAR}$ of hub attachment region.

A semi-rigid caul 104 (see FIG. 15) is disposed over the exposed upper surface $CL_S$ of the composite lay-up CL and an impervious flexible membrane 106, commonly referred to as the vacuum bag, is disposed over the caul 104 and sealed to the base mold 100. A vacuum source 108 evacuates the mold cavity occupied by the composite lay-up CL such that the vacuum bag and semi-rigid caul compact the lay-up CL in preparation for autoclave curing. The entire mold assembly 110 is placed in autoclave (not shown) wherein heat and additional pressure is applied to the lay-up CL for curing the composite lay-up CL. The cured composite lay-up CL is formed to net width dimensions using conventional cutting apparatus such as a high speed, multi-axis milling machine. The final forming step includes milling the edges of the optimized flexbeam to produce the chamfered edge surfaces described above.

While the preferred embodiment of the optimized flexbeam 10 incorporates various regions and subregions in combination, it will be appreciated that the specific teaching of a single region, e.g. the inboard transition region ITR, may be applied to other flexbeam configurations. That is, the teachings associated with the inboard transition region ITR may be used in combination with other regions having a conventional configuration such as those taught in the prior art or having modified configurations to suit a particular application. For example, the inboard transition region ITR may be used in combination with a pitch region having a right-angled edge configuration and/or a single material composite laminate, e.g., all unidirectional graphite or all unidirectional fiberglass material. Furthermore, the inboard transition region ITR may be used in combination with a hub attachment region having a non-constant width and thickness dimension so as to be compatible with other hub attachment arrangements.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. An optimized composite flexbeam (10) having a plurality of adjoining regions including a hub attachment region (HAR), a blade attachment region (BAR), a pitch region (PR) and an outboard transition region (OTR) disposed between and adjoining the pitch region and blade attachment regions (PR, BAR), the optimized composite flexbeam (10) further comprising:

an inboard transition region (ITR) disposed between and adjoining the pitch and hub attachment regions (PR, HAR) and having a combination of unidirectional and off-axis composite materials (U, O) defining a total material composition and a percent %O of off-axis composite material (O) relative thereto, said inboard transition region (ITR) further including:

a first transition subregion (ITR-1) defined by a thickness transition; and a second transition subregion (ITR-2) defined by a width and thickness transition and defining a width conic, said second transition subregion (ITR-2) defining a critical width transition subregion ($CR_{wt}$);

said width conic defining conic slope angles $\theta_{WC}$;

said critical width transition subregion ($CR_{wt}$) corresponding to conic slope angles $\theta_{wc}$ between 0 degrees to about 10 degrees;

said percent %O of off-axis composite material (O) defined by an optimized curve (76), said optimized curve (70) in said critical transition subregion subregion ($CR_{wt}$) being defined by the expression:

$$\% O = C + \sqrt{900 - [k\theta_{wc} - 30]^2}$$

wherein C is a constant between about 14.4 to about 21.6, and k is a constant equal to 1.0 degrees$^{-1}$.

2. The optimized composite flexbeam (10) according to claim 1 wherein said first transition subregion (ITR-1) and said second transition subregion (ITR-2) define a juncture therebetween, wherein said first transition subregion (ITR-1) defines a spanwise length dimension ($L_1$) and a spanwise position ($I_{BU}$) defining an initial build-up of said off-axis composite material (O), said spanwise position ($I_{BU}$) being radially outboard of said juncture.

3. The optimized composite flexbeam (10) according to claim 2 wherein said spanwise position ($I_{BU}$) is disposed a distance ($D_S$) from said juncture, said distance ($D_S$) being between about 15% to about 25% of said spanwise length dimension ($L_1$).

4. The optimized composite flexbeam (10) according to claim 1 wherein said second transition subregion (ITR-2) defines thickness juncture ($T_T$), and wherein said width conic continues radially inboard of said thickness juncture ($T_T$).

5. The optimized composite flexbeam (10) according to claim 4 wherein said hub attachment region (HAR) defines a mounting aperture (40) having a diameter dimension ($D_A$) and a geometric center ($40_C$), and wherein said width conic defines a point $C_L$ disposed therealong, said point ($C_L$) defining a distance dimension S from said geometric center ($40_C$), said distance and diameter dimensions S, D defining an S/D ratio, said S/D ratio being between about 1.60 to about 1.85.

* * * * *